United States Patent [19]

Medeiros et al.

[11] Patent Number: 5,774,875

[45] Date of Patent: Jun. 30, 1998

[54] PHARMACEUTICAL RECORDKEEPING SYSTEM

[75] Inventors: Joel E. Medeiros, Delran; Louis M. Gaburo, Madison; Stewart E. Hartkopf, Cherry Hill, all of N.J.

[73] Assignee: Base Ten Systems, Inc., Trenton, N.J.

[21] Appl. No.: 747,175

[22] Filed: Nov. 12, 1996

Related U.S. Application Data

[63] Continuation of Ser. No. 503,408, Jul. 17, 1995, abandoned, which is a continuation of Ser. No. 109,788, Aug. 20, 1993, abandoned.

[51] Int. Cl.[6] .......................... G06F 19/00; G06F 17/00; G01N 15/00; G01N 31/00

[52] U.S. Cl. ................. 705/28; 705/1; 235/375; 235/385; 364/468.16; 364/468.22; 364/478.13; 364/497; 422/62

[58] Field of Search .................................. 705/1, 22, 28, 705/29; 235/375, 376, 383, 385, 431; 346/33 ME, 33 TP; 364/468.01, 468.15, 468.16, 468.17, 468.22, 468.23, 478.01, 478.03, 478.13, 496, 497, 130; 422/62, 67

[56] References Cited

U.S. PATENT DOCUMENTS

| | | |
|---|---|---|
| 3,831,006 | 8/1974 | Chaffin, III et al. .................... 235/375 |
| 4,953,075 | 8/1990 | Nau et al. ................................. 364/140 |
| 5,004,582 | 4/1991 | Miyata et al. ............................. 422/56 |
| 5,029,065 | 7/1991 | Nau et al. ................................. 364/146 |
| 5,030,418 | 7/1991 | Miyata ....................................... 422/63 |
| 5,122,343 | 6/1992 | Ishizaka et al. ........................... 422/66 |
| 5,122,969 | 6/1992 | Seshimoto et al. ...................... 364/497 |
| 5,139,743 | 8/1992 | Ishizaka et al. ........................... 422/63 |
| 5,169,600 | 12/1992 | Ishizaka et al. ........................... 422/66 |

*Primary Examiner*—Gail O. Hayes
*Assistant Examiner*—Stephen R. Tkacs
*Attorney, Agent, or Firm*—Sprung Kramer Schaefer & Briscoe

[57] ABSTRACT

A recordkeeping method comprises assigning serialized portable memory devices to individual lots of material and manufacturing process batches, writing identification and requirements data into the portable memory devices, writing manufacturing and test data into the portable memory devices during the process and writing the manufacturing and test data from one portable memory device into another by first reading the identification data from the both portable memory devices, comparing the identification data read from the two portable memory devices and writing the manufacturing and test data into the other portable memory device if the comparison is favorable.

22 Claims, 4 Drawing Sheets

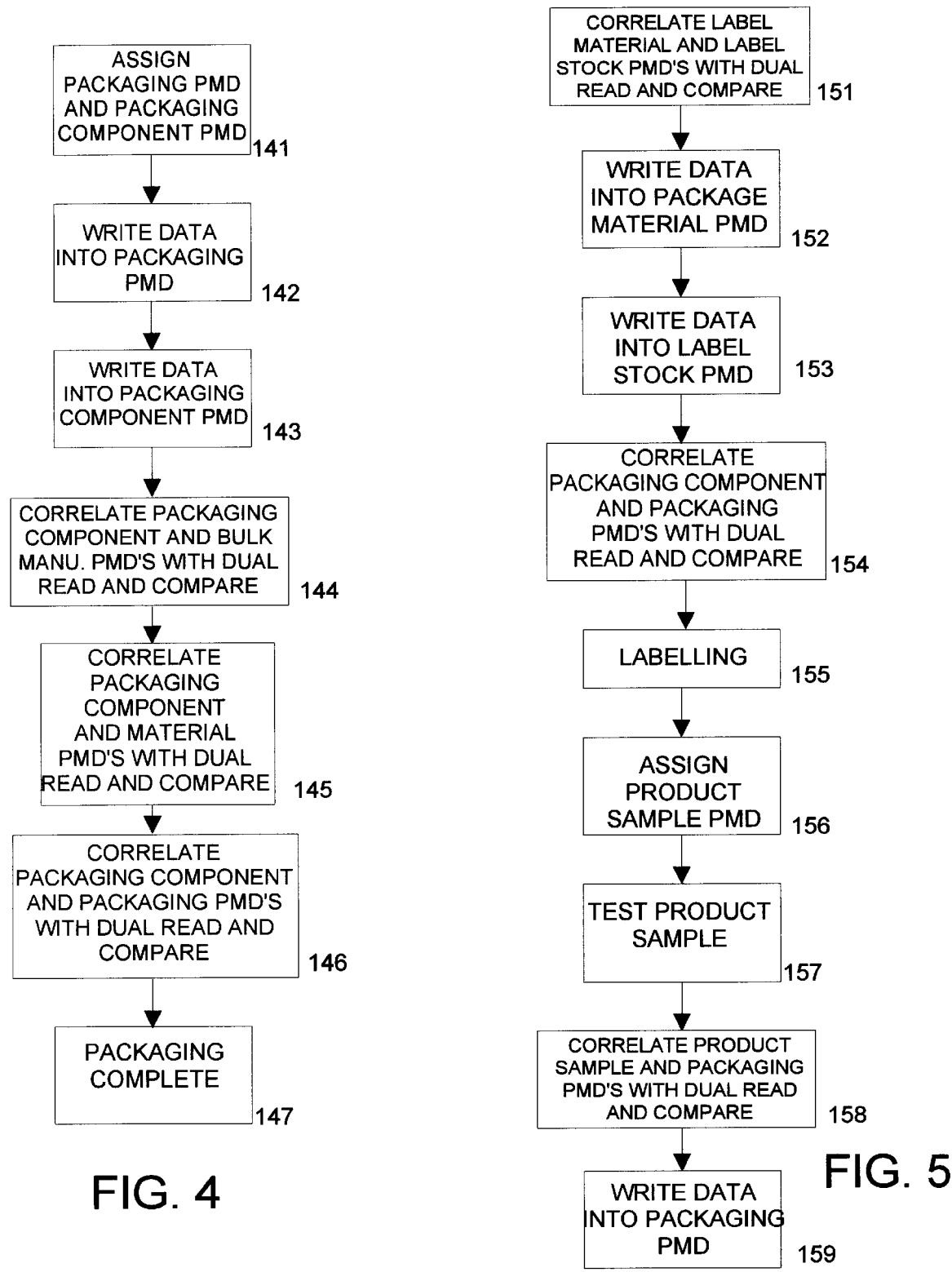

PHARMACEUTICAL RECORDKEEPING SYSTEM

This application is a continuation, of application Ser. No. 08/503,408, filed Jul. 17, 1995 abandoned, which is a continuation of application Ser. No. 08/109,788, filed Aug. 20, 1993 now abandoned.

BACKGROUND OF THE INVENTION

The present invention relates to a system for assuring compliance with procedures in ongoing production processes and in particular a pharmaceutical recordkeeping system.

Currently, many manufacturing processes are regulated by government and state agencies which set forth procedures with which manufacturers must comply in order to obtain regulatory approval for their products. For example, pharmaceutical manufacturing processes must comply with NDA/ANDA procedures and must accumulate permanent raw material and manufacturing batch processing records in compliance with FDA regulations.

While manufacturers have complied with these rules and regulations by manual recordkeeping, there has been a need for an automated system which can adapt to the specific needs of each manufacturer while maintaining compliance with manufacturing procedures and recordkeeping requirements.

SUMMARY OF THE INVENTION

The main object of the present invention is to provide an automated system for assuring compliance and permanent records of ongoing production processes.

These and other objects of the present invention are achieved in accordance with the present invention by the use of a system comprising portable memory devices (PMD's) and associated stations having read/write equipment to document process requirements and permanently record process data, all under the control of a main processor. The PMD's are secure, serialized, non-alterable electronic tags which travel with the materials or manufacturing batches. Data is permanently written into the "write once read many" memory in the PMD. An example of a device which is useful for this purpose is the Fujitsu MB98A6070, MB98A6080, MB98A6090 and MB98A6100 one time programmable read only memory card. Once data has been written into the PMD, the data cannot be altered, but, can be read as many times as necessary thereafter. Additional data can be sequentially added to the PMD, up to the memory capacity of the PMD.

In accordance with the invention, master production and control procedures and requirements are entered into a PMD when manufacturing is initiated. The identification and process record data required by the FDA, is written into the PMD's on a real time basis for comparison with the process requirements and the permanent archiving of actual process data. The data is written into and retrieved from the PMD's using stationary or handheld read/write equipment at each process station. There are two different types of PMD's available. One type uses a radio frequency or electromagnetic signal to communicate with the PMD during the read/write functions. The other type of PMD plugs directly into the read/write equipment, making a direct electrical connection for communications. Management of the recorded data is controlled by a main processor linked to each station by a bus or network connection. The main processor controls the security and accessibility to the data in each PMD, performs data comparisons for verification of materials, products, equipment, test samples and controlled parameters contained within each PMD to provide alerts in the event of errors. The main processor provides an index of the PMD's and can also assemble and format a printout of the stored data for review and evaluation at a later time.

In a particularly advantageous commercial embodiment of the present invention, a pharmaceutical manufacturing system can be implemented wherein individual PMD's are assigned to each lot of raw material upon receipt by the manufacturer. The specific material identification, receipt date, weight or measure, unique lot number and a delineation of all sample test requirements for final acceptance are written into the PMD for each lot. When samples are withdrawn from the material lot for acceptance tests, intermediary PMD's are assigned to each sample to assure correlation of the samples to the material in quarantine. The specific material identification and test requirements are read from the raw material PMD and written into the sample PMD. The sample PMD then travels with the sample of material through the completion of the testing. Test pass or fail notations are written into the sample PMD by the test laboratory at the specific station and the sample PMD is returned to the raw material quarantine area for correlation with the original material PMD through a dual read and compare routine. Following this routine, the test results are read from the sample PMD and written into the correct raw material PMD. The sample PMD can then be reused for the sampling of other raw material, or archived when the memory capacity has been exhausted.

When all material acceptance requirements have been satisfied, the raw material PMD is again written into to indicate that the material is accepted and the raw material, together with its raw material PMD, is moved together out of quarantine and into usable stock.

The system is also used in the dispensing of raw materials for the manufacturing processes. Manufacturing components are requested from the raw material in usable stock via a PMD containing the identification of the manufacturing batch and the specifics of the requested raw material. The application of a dual read and compare routine to the requesting manufacturing component PMD and the raw material PMD assures positive correlation between the requested material and the actual material that is dispensed.

The specific manufacturing batch identification and dispensed weight or measure are written into the raw material PMD each time material is dispensed or issued. Likewise, the raw material lot identification and dispensed weight or measure are written into the manufacturing component PMD for return to the manufacturing process along with the dispensed material.

Other information is added to the PMD's at various times during the process and annotations of the date and time, the identification of the performing and verifying individuals and traceable references to any problem investigations, represent some of the additional data included in the PMD.

When the lot of raw material has been exhausted, reconciliation of the dispensed versus the total received weight or measure may be performed since the raw material PMD contains a complete and unalterable history of the specific lot of raw material. The raw material PMD is then archived for later retrieval of data for the duration of the required FDA retention period. If sufficient unused memory capacity remains, the PMD may be used for additional lots of raw material before being retired to the archives.

In manufacturing, two PMD's are assigned to each manufacturing batch at the time of production authorization. One PMD, the manufacturing PMD, is formatted with the specific product and batch identification, along with a reproduction of the complete master process and control requirements for the product. The second PMD, the component PMD, is formatted with some of the same information, however, with specific annotations with all of the material components required during the manufacturing process.

As the manufacturing process is implemented, actual process information is recording on the manufacturing PMD. This information includes the equipment used, the yields obtained and compliance with specific process limitations such as time, temperature and speed. Comparison routines verify the actual data with the established master production and control requirements or limits and can alert the operator to the need to resolve any discrepancies.

As described with regard to the raw material, intermediary samples PMD's can be used for the manufacturing in process sample tests. The sampling requirements are written from the manufacturing PMD into the sample PMD when the sample is required. Later, the results of the sample testing are written from the sample PMD into the manufacturing PMD upon successful completion of each test.

The associated component PMD is used and actually moves between the manufacturing process and the stock room, to verify the dispensing of the required material. As with the correlation of the requested and dispensed raw material heretofore described, the component PMD also provides positive assurance that the correct material is used in the manufacturing process. The dual read and compare routine is applied to both the component and manufacturing PMD's upon return of the dispensed material from the stock room and before introduction of the raw material into the manufacturing process.

Other required information can also be added to the manufacturing and component PMD's at various times during the process, including verifications to proceed and final acceptance of the product by quality assurance.

Assuming bulk product is completed and held for later packaging, two new PMD's are assigned to each packaging lot. These PMD's are used in the same manner as the manufacturing and component PMD's to control and monitor the packaging process and materials. Product distribution may be added to the packaging PMD as the product is shipped.

The bulk manufacturing and packaging PMD's contain a complete unalterable history of the process, including verification of compliance with the requirements of the master production and control record. These PMD's are then archived after depletion of the batch of bulk production and completion of finished product inspections, record reviews and distribution of the packaged products for FDA record review in the future. If sufficient unused memory capacity remains, the manufacturing and packaging PMD's may be used for additional batches before being retired to the archives.

Each PMD contains a unique, permanently recorded, serial number in the memory. The additional permanently recorded cross referencing of material lot numbers, manufacturing batch numbers, and the PMD serial numbers in companion PMD's, make it virtually impossible to covertly alter or destroy actual recorded historical data. Therefore, the invention prevents undetected data tampering and an extremely high level of archive data security.

Throughout the raw material and manufacturing processing, the PMD data is periodically accessed and stored in a database in the main processor for appropriate analysis. A cross referenced index of the PMD's is established, updated, and maintained in the database of the main processor to facilitate the location of specific archived material or product batch data.

BRIEF DESCRIPTION OF THE DRAWINGS

FIG. 4 is a flow chart of a further continuation of the flow chart of FIG. 3; and FIG. 5 is a flow chart of a still further continuation of the flow chart of FIG. 3.

DETAILED DESCRIPTION OF THE INVENTION

Figure 1:
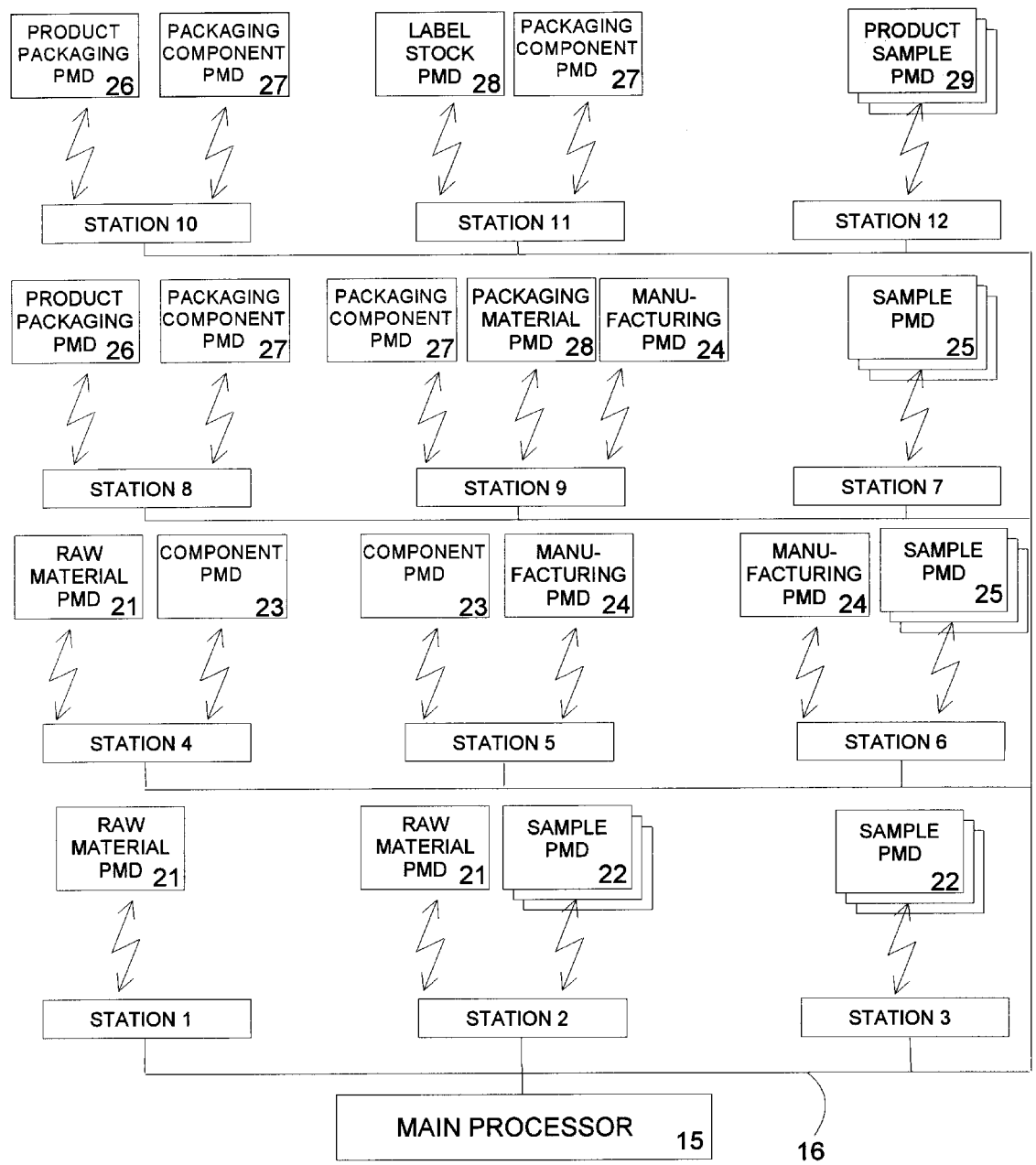
FIG. 1 is a block diagram of the system according to the present invention.
Figure 2:
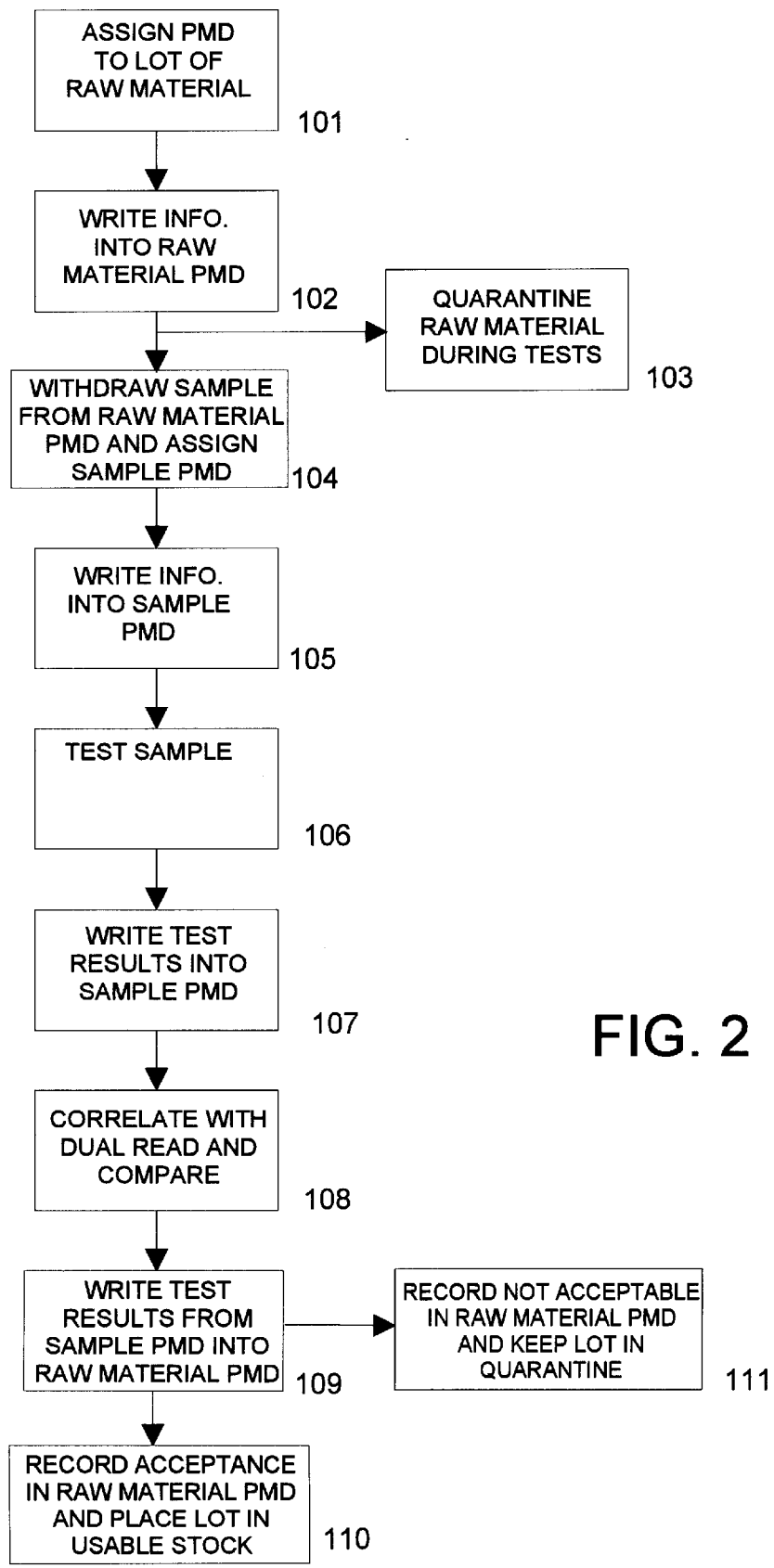
FIG. 2 is a flow chart of a method in accordance with the present invention.
Figure 3:
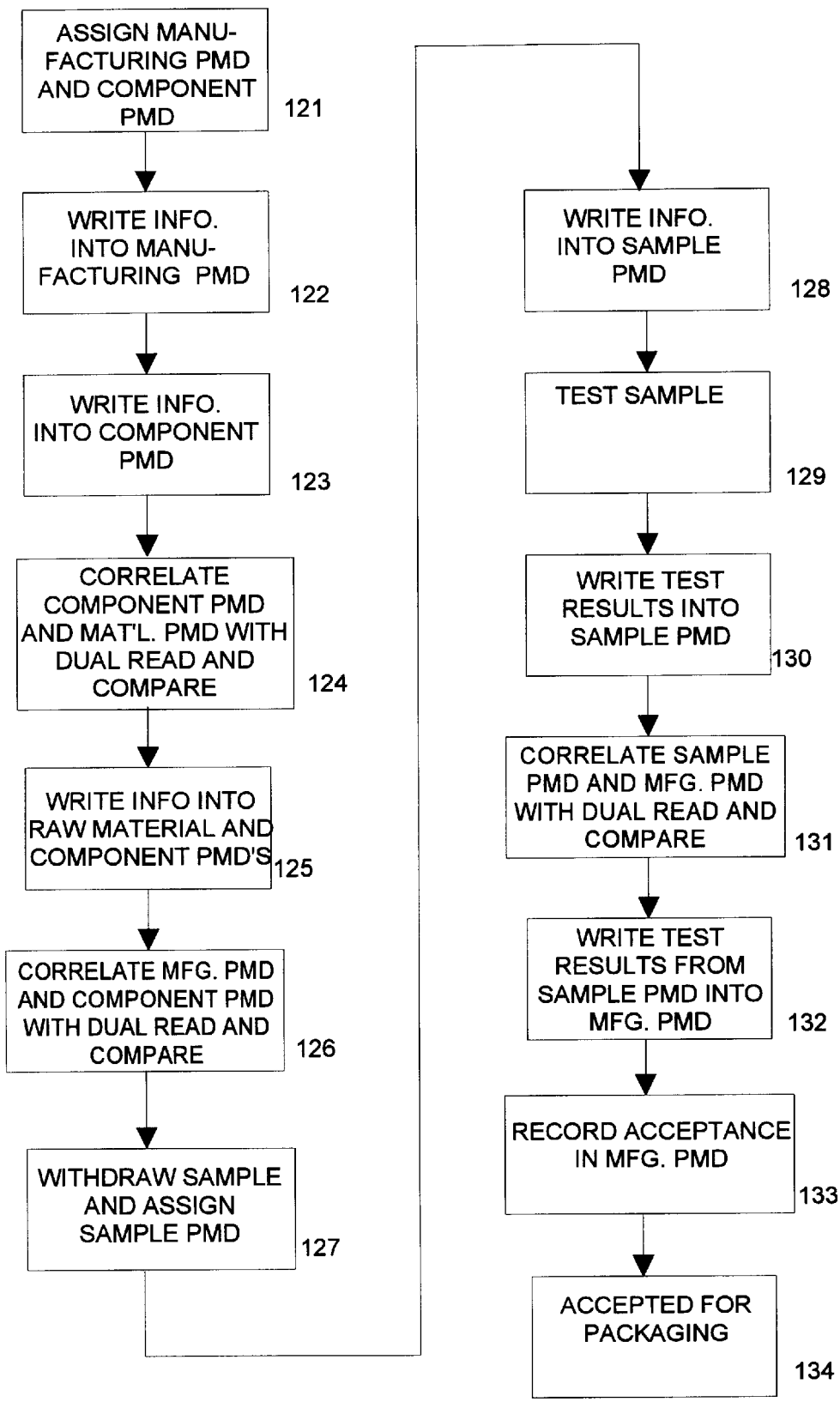
FIG. 3 is a flow chart of a continuation of the flow chart of FIG. 2.

Referring now to FIGS. 1–5, a preferred embodiment of the present invention is described with reference to a system for producing pharmaceutical products. It is understood by those skilled in the art that the present invention can be adapted to other processes where high levels of security and preventing the tampering of records is required.

A main processor 15 is connected to a plurality of stations 1–12 via bus 16. Stations 1–12 interact with a plurality of portable memory devices (PMD's) 21–29 by means of electronic signals or electromagnetic waves. The PMD's 21–29, for example, may have up to 1 mb of storage and can be written into and read out from via electronic signals or electromagnetic waves transmitted from stations 1–12 to PMD's 21–29 and received from PMD's 21–29 at stations 1–12 which are stationary or handheld read/write devices. Examples of PMD's and stations are disclosed in U.S. Pat. Nos. 4,242,663, 4,549,264 and 4,724,427, the disclosures of which are hereby incorporated by reference.

The main processor 15 includes a microprocessor and main memory which receives data from stations 1–12 and sends data to stations 1–12 for transmittal to the PMD's 21–29. Main processor 15 is preferably a microcomputer having an Intel microprocessor, such as the 80486 or a Macintosh computer based on a Motorola microprocessor.

The first stage of a pharmaceutical manufacturing process involves the reception and acceptance of raw material which is to be used to manufacture a product. When raw material is received at station 1, the name and code of the material, as well as the date, weight or measure and vendor of the raw material is entered into the memory of the main processor 15. At that time in step 101, a raw material PMD 21 is assigned to the lot of raw material and is formatted by main processor 15. The raw material PMD has data written into it from a database in main processor 15 in step 102 via station 1 and this information includes the material name and code, the material lot number, the vendor, the acceptance requirements including the sample required, examination and test required, as well as the criteria for the test, the date received, the total weight or measure and reconciliation limits.

The lot with the raw material PMD 21 is moved into quarantine at station 2 in step 103 whereupon samples are removed for various acceptance tests in step 104. Each sample has a sample PMD 22 assigned to it. Under the control of the main processor 15, data from the raw material PMD is written into the sample PMD's in step 105 including the material name and code, the material lot number, the sample required, the required tests and criteria, the sample date, the I.D. of the person taking the sample.

The samples are moved to station 3 where the tests are conducted in step 106 and each test PMD 22 has data written into it in step 107 reflecting whether or not it passed or failed its particular test, the I.D. of the person making the test and the date of the test.

The sample PMD's 22 are then moved back to station 2 whereupon a dual read and compare is performed in step 108 wherein main processor 15 verifies that common data is read from the sample PMD 22 and the raw material PMD 21 specifically relating to the material name and code and the material and lot number. Upon verification, the data relating to the tests are written from the sample PMD into the raw material PMD in step 109 including the sample date, sampling person I.D., whether the test was passed or not, the test person I.D. and test date.

Based upon the results of the test, the raw material must either be accepted or rejected. This acceptance or rejection is written into the raw material PMD in steps 110 or 111, as well as the identification of the person making the decision. If the material is rejected, it is kept in quarantine or disposed of in step 111. If the material is accepted, the lot of raw material is placed in usable stock.

The manufacturing process uses components of raw materials which have been accepted and placed in usable stock.

In the bulk manufacturing process, initially two .PMD's are assigned for a product in step 121. The first PMD is a batch manufacturing PMD 24 and the second PMD is a batch component PMD 23. At station 5, the manufacturing PMD 24 is formatted by the main processor 15 which writes into the manufacturing PMD in step 122, product identification including the product name and code, the strength or dosage of the product, the batch size, the batch lot number and the master production and control for the processing including each step of the production, as well as the process requirements for each step. These requirements include the equipment to be used, the process theoretical yield and acceptable tolerances, and process limitations including tolerances on time, temperature and speed. The in-process test requirements including the number of samples required, the tests required, and their criteria are also recorded.

The component PMD 23 is formatted by main processor 15 which writes into it in step 123 the product identification and master production and control data including for each step, the material required including the active ingredients identified by material name and code and weight or measure required and the same information for any components of the product being manufactured.

When the order is released for production, the date and the electronic signature of the release person is written into the manufacturing PMD and the component PMD.

Component PMD 23 is then moved to station 4 where raw material and raw material PMD 21 are located. A dual read and compare is performed in step 124 between the component PMD and the raw material PMD to verify a common material name and code. Upon verification, the material lot number and the acceptance of the material is read from the raw material PMD and written into the component PMD in step 125. The product identification information is read from the component PMD and written into the raw material PMD. Furthermore, the amount of material dispensed is indicated in the raw material PMD so that a reconciliation can be performed in the main processor 15. The main processor, upon determining that the first raw material has been dispensed, will indicate to an operator that another raw material is needed at station 4, and the steps 124 and 125 will be repeated until all of the required materials have been dispensed.

The component PMD then returns to station 5 for the first step of the manufacturing process. Before the first process step is performed, a dual read and compare operation is performed in step 126 between the component PMD and the manufacturing PMD to verify that common product identification and common master production and control data are contained on the two PMD's.

At this time, various process steps are performed to manufacture the product. For each process step, the dual read and compare operation is performed as further material components are added. Moreover, data is written into the manufacturing PMD for each process step including the fact that material has been dispensed And verified, the equipment that is used, the start time and date, actual yield and whether the yield was within the limits, completion time and whether the completion time was within the limits, the process operator I.D., and the supervisor I.D.

After the process step, the batch is moved to station 6 in step 127 where samples are withdrawn and sample PMD's 25 are provided for each sample. Data is read from the manufacturing PMD and written into the sample PMD in step 128 including product identification, the step number, the sample required, the test required and the criteria.

The tests are performed at station 7 in step 129 and data is written into each sample PMD in step 130 including the sample date, the I.D. of the person taking the sample, whether or not the test was passed, the I.D. of the person administering the test and the date of the test.

The sample PMD is returned to station 6 where a dual read and compare is performed in step 131 with the manufacturing PMD to verify that common data relating to the product identification and the master production and control is present. Upon verification, data relating to the sample and test is read from the sample PMD and written into the manufacturing PMD in step 132. Based upon the test data, the sample is noted as having been completed and accepted and the acceptance and the I.D. of the person making this acceptance is written into the manufacturing PMD in step 133.

The product batch, manufacturing PMD, and component PMD are then moved to station 5 for the next step in the process and steps 124–133 are repeated for each process step.

In the last step of the manufacturing process, the component PMD can be used to obtain capsules for encapsulating the finished product. The component PMD would include for this last step the capsule requirements and the material would be encapsulated at station 5. The same testing can be performed at station 6 and station 7 before the finished bulk product is finally approved and accepted for packaging in step 134.

At this time, the product packaging PMD 26, and packaging component PMD 27, are assigned in step 141. These new PMD's have similar purposes to the manufacturing PMD 24, and the manufacturing component PMD 23, described earlier. The main processor 15 formats the product packaging PMD 26 at station 8 and writes data therein in step 142 including product identification, product name and code, strength and dosage, packaging lot number, package quantity, content quantity, packaging requirements including containers, seals, and labeling requirements, and the final product sampling test requirements. The packaging component PMD 27 is formatted in step 143 with the same product identification information and the specific requirements for packaging materials, labels, and the bulk manufactured product weight or measure. When the packaging process lot is released, this fact is written into the product packaging and packaging component PMD's including the date and electronic signature of the person making the release.

The packaging component PMD 27 moves between stations 8 and 9, as in the case of the manufacturing component PMD which moved between stations 4 and 5, to obtain the accepted bulk product and packaging materials form stock. First, the packaging component PMD 27 is correlated with the bulk manufacturing PMD 24 using the dual read and compare routine at station 9. The manufacturing batch identification is read from the manufacturing PMD and written into the packaging component PMD, and the packaging lot identification is read from the packaging component PMD and written into the manufacturing PMD.

The packaging component PMD 27 is used again in step 145 to correlate with the packaging material PMD 28 at station 9 to verify the correct materials and transfer the identification information between the PMD's. The packaging material PMD is similar to the raw material PMD in function. The packaging components and packaging component PMD return to station 8, and are correlated with the product packaging PMD in step 146 using the dual read and compare routine. The product is packaged in step 147 and the packaging process parameters are recorded in the product packaging PMD along with the date and packaging, person I.D.

After the product is finally packaged in step 147, it must be labeled.

Labels maintained in stock have a label stock PMD 28 associated therewith which includes label identification including product name, strength, dosage form, content quantity and label lot number, whether the labels have been accepted, the date labels were received, the total quantity received and information relating to reconciliation.

The packaging component PMD 27 is used when labels are obtained from the label stock by first doing a dual read and compare with the label stock PMD at station 11 in step 151 to verify the product identification information on both. Upon verification, the label lot number and the fact that the labels were accepted is written into the packaging component PMD 27 in step 152 from the label stock PMD in station 11. Moreover, the quantity of labels dispensed and the I.D. of the person doing the dispensing is written into the packaging material PMD.

The information in the packaging component PMD 27 relating to the batch number of the product and the quantity of labels dispensed is read from the packaging component PMD and written into the label stock PMD in step 153.

The labels and the packaging component PMD 27 return to station 10 and are correlated with the product packaging PMD 26 using the dual read and compare routine. The labeling is performed in step 155 and the product packaging PMD is updated with the identification of the labeling person and the labeling meet the requirements thereof. The packaging component PMD is annotated with the returned and destroyed labels. The returned labels and the packaging component PMD move back to station 11 to update the label stock PMD with the returned and destroyed label data to provide for positive label stock reconciliation.

After the labeling is completed, in step 156 a product sample PMD 29 is formatted by writing the product identification, sample quantity required and the required tests from the product packaging PMD. The product sample PMD travels with the product sample which is thereafter tested at station 12 in step 157 and returned to station 10 where a dual read and compare is performed in step 158 to verify the product identification codes on the product sample PMD and the product packaging PMD. The product inspection data which was written into the product sample PMD during inspection, is then written from the product sample PMD into the product packaging PMD in step 159.

For each recording of data into the PMD's described above, there is preferably a later transfer of that data from the PMD into the main processor 15.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

What is claimed is:

1. A method for recordkeeping comprising the steps of:
   (a1) providing a first portable memory with a unique serial number recorded therein, for a first lot of raw material to be received and tested;
   (a2) writing raw material identification and test requirements data into the first portable memory relating to the first raw material lot;
   (a3) providing a second portable memory with a unique serial number recorded therein, for a sample from the first raw material lot;
   (a4) writing said raw material identification, test requirements, and the serial number from the first portable memory into the second portable memory;
   (a5) testing the sample and writing test data into the second portable memory; and
   (a6) writing the test data and the serial number from the second portable memory into the first portable memory by first reading the identification data from the both the first and second portable memories, comparing the identification data read from the first and second portable memories and writing the test data and the serial number of the second portable memory into the first portable memory if the comparison is favorable; and
   (a7) repeating steps (a1) through (a6) using additional first and second memories, for additional lots of raw material.

2. The method according to claim 1, further comprising the steps of:
   (b1) providing a third portable memory with a unique serial number recorded therein, for a first lot of packaging material to be received and tested;
   (b2) writing packaging material identification and test requirements data into the third portable memory relating to the first packaging material lot;
   (b3) providing a fourth portable memory with a unique serial number recorded therein, for a sample from the first packaging material lot;
   (b4) writing said packaging material identification, test requirements, and the serial number from the third portable memory into the fourth portable memory;
   (b5) testing the sample and writing test data into the fourth portable memory; and
   (b6) writing the test data and the serial number from the fourth portable memory into the third portable memory by first reading the identification data from both the third and fourth portable memories, comparing the identification data read from the third and fourth portable memories and writing the test data and the serial number of the fourth portable memory into the third portable memory if the comparison is favorable; and (b7) repeating steps (b1) through (b6), using additional third and fourth memories, for additional lots of packaging material.

3. The method according to claim 2, further comprising the steps of:

(c1) providing a fifth portable memory with a unique serial number recorded in the memory, for a first lot of labeling material received and to be tested;

(c2) writing labeling material identification and test requirements data into the fifth portable memory relating to the first labeling material lot;

(c3) providing a sixth portable memory with a unique serial number recorded in memory, for a sample from the first labeling material lot;

(c4) writing said labeling material identification, test requirements, and the serial number from the fifth portable memory into the sixth portable memory;

(c5) testing the sample and writing test data into the sixth portable memory;

(c6) writing the test data and the serial number from the sixth portable memory into the fifth portable memory by first reading the identification data from the both the fifth and sixth portable memories, comparing the identification data read from the fifth and sixth portable memories and writing the test data and the serial number into the fifth portable memory if the comparison is favorable; and (c7) repeating steps (c1) through (c6), using additional fifth and sixth memories for additional lots of labeling material.

4. A method according to claim 3, further comprising the steps of:

(d1) providing a seventh portable memory with a unique serial number recorded therein, for a first product to be produced from a plurality of lots of raw material;

(d2) writing product identification, process and test requirements data into the seventh portable memory relating to the first product to be produced;

(d3) providing an eighth portable memory with a unique serial number recorded in the memory, for the first product to be produced from the plurality of lots of raw material;

(d4) writing product identification and product raw material component requirements data into the eighth portable memory relating to the first product to be produced;

(d5) writing the serial number from the seventh portable memory into the eighth portable memory by first reading the identification data from both the seventh and eighth portable memories, comparing the identification data read from the seventh and eighth portable memories and writing the serial number if the comparison is favorable;

(d6) writing the serial number from the eighth portable memory into the seventh portable memory if the identification data comparison is favorable;

(d7) obtaining a portion of the first lot of material for the first product to be produced and writing material lot data and serial number from the first portable memory into the eighth portable memory by first reading the material identification data from the first portable memory and the material component requirements data from the eighth portable memory, comparing the material identification and requirements data read from the first and eighth portable memories and writing the material lot data and serial number into the eighth portable memory if the comparison is favorable;

(d8) writing the product batch data and serial number from the eighth portable memory into the first portable memory if the comparison is favorable;

(d9) writing the material lot data from the eighth portable memory into the seventh portable memory by first reading the product identification data from both the seventh and eighth portable memories, comparing the product identification data read from the seventh and eighth portable memories and writing the material lot data into the seventh portable memory if the comparison is favorable; and (d10) repeating steps (d7) through (d9) for each raw material component of the first product to be produced.

5. The method according to claim 4, further comprising the steps of:

(e1) providing a ninth portable memory with a unique serial number recorded therein, for a sample from the first product batch;

(e2) writing product identification, test requirements, and the serial number from the seventh portable memory into the ninth portable memory;

(e3) testing the sample and writing test data into the ninth portable memory; and (e4) writing the test data and the serial number from the ninth portable memory into the seventh portable memory by first reading the identification data from both the seventh and ninth portable memories, comparing the identification data read from the seventh and ninth portable memories and writing the test data and the serial number of the ninth portable memory into the seventh portable memory if the comparison is favorable.

6. The method according to claim 5, further comprising the steps of:

(f1) providing a tenth portable memory with a unique serial number recorded therein, for a portion of the first product to be packaged and labeled;

(f2) writing packaged product identification, and packaging and labeling process and test requirements data into the tenth portable memory relating to the packaged portion of the first product;

(f3) providing an eleventh portable memory with a unique serial number recorded in the memory, for a portion of the first product to be packaged and labeled;

(f4) writing packaged product identification, and the packaging and labeling material component requirements data into the eleventh portable memory relating to the packaged portion of the first product;

(f5) writing the serial number from the tenth portable memory into the eleventh portable memory by first reading the packaged product identification data from both the tenth and eleventh portable memories, comparing the packaged product identification data read from the tenth and eleventh portable memories and writing the serial number if the comparison is favorable;

(f6) writing the serial number from the eleventh portable memory into the tenth portable memory if the packaged product identification data comparison is favorable;

(f7) obtaining a portion of the first product to be packaged and labeled, and writing product batch data and serial number from the seventh portable memory into the eleventh portable memory by first reading the product identification data from the seventh portable memory and the packaging product requirements data from the eleventh portable memory, comparing the product identification and requirements data read from the seventh and eleventh portable memories and writing the product batch data and serial number into the eleventh portable memory if the comparison is favorable;

(f8) writing the packaged product lot data and serial number from the eleventh portable memory into the seventh portable memory if the comparison is favorable;

(f9) writing the product batch data from the eleventh portable memory into the tenth portable memory by first reading the packaged product identification data from both the tenth and eleventh portable memories, comparing the packaged product identification data read from the tenth and eleventh portable memories and writing the packaged material lot data into the tenth portable memory if the comparison is favorable.

7. The method according to claim 6, further comprising the steps of:

(g1) obtaining a portion of the first packaging material for the first product to be packaged and labeled, and writing packaging material lot data and serial number from the third portable memory into the eleventh portable memory by first reading the packaging material identification data from the third portable memory and the packaging material requirements data from the eleventh portable memory, comparing the packaging material identification and requirements data read from the third and eleventh portable memories and writing the packaging material lot data and serial number into the eleventh portable memory if the comparison is favorable;

(g2) writing the packaged product lot data and serial number from the eleventh portable memory into the third portable memory if the comparison is favorable;

(g3) writing the packaging material lot data from the eleventh portable memory into the tenth portable memory by first reading the packaged product identification data from both the tenth and eleventh portable memories, comparing the packaged product identification data read from the tenth and eleventh portable memories and writing the packaging material lot data into the tenth portable memory if the comparison is favorable; and (g4) repeating steps (g1) through (g3) for each packaging material component of the first product to be packaged.

8. The method according to claim 7, further comprising the steps of:

(h1) obtaining a portion of the first lot of labeling material for the first product to be packaged and labeled, and writing labeling material lQt, data and serial number from the fifth portable memory into the eleventh portable memory by first reading the labeling material identification data from the fifth portable memory and the labeling material requirements from the eleventh portable memory, comparing the labeling material identification and requirements data read from the fifth and eleventh portable memories and writing the labeling material lot data and serial number into the eleventh portable memory if the comparison is favorable;

(h2) writing the packaged product lot data and serial number from the eleventh portable memory into the fifth portable memory if the comparison is favorable;

(h3) writing the labeling material lot data from the eleventh portable memory into the tenth portable memory by first reading the packaged product identification data from both the tenth and eleventh portable memories, comparing the packaged product identification data read from the tenth and eleventh portable memories and writing the labeling material lot data into the tenth portable memory if the comparison is favorable; and (h4) repeating steps (h1) through (h3) for each labeling material component of the first product to be packaged and labeled.

9. The method according to claim 8, further comprising the steps of:

(i1) providing a twelfth portable memory with a unique serial number recorded therein, for a sample from the first product packaged and labeled;

(i2) writing the packaged product identification, test requirements, and the serial number from the tenth portable memory into the twelfth portable memory;

(i3) testing the sample and writing test data into the twelfth portable memory; and;

(i4) writing the test data and the serial number from the twelfth portable memory into the tenth portable memory by first reading the packaged product identification data from the both the tenth and twelfth portable memories, comparing the packaged product identification data read from the tenth and twelfth portable memories and writing the test data and the serial number of the twelfth portable memory into the tenth portable memory if the comparison is favorable.

10. The method of claim 9, further comprising reading data and serial numbers from the portable memories and writing the data and serial numbers into a main computer database.

11. A method for recordkeeping, comprising the steps of:

(a) providing a first portable memory with a unique serial number recorded therein, for a first lot of packaging material to be received and tested;

(b) writing packaging material identification and test requirements data into the first portable memory relating to the first packaging material lot;

(c) providing a second portable memory with a unique serial number recorded therein, for a sample from the first packaging material lot;

(d) writing said packaging material identification, test requirements, and the serial number from the first portable memory into the second portable memory;

(e) testing the sample and writing test data into the second portable memory; and (f) writing the test data and the serial number from the second portable memory into the first portable memory by first reading the identification data from both the first and second portable memories, comparing the identification data read from the first and second portable memories and writing the test data and the serial number of the second portable memory into the first portable memory if the comparison is favorable; (g) repeating steps (a) through (f), using additional first and second memories, for additional lots of packaging material.

12. The method of claim 11, further comprising reading data and serial numbers from the portable memories and writing the data and serial numbers into a main computer database.

13. A method for recordkeeping comprising the steps of:
(a) providing a first portable memory with a unique serial number recorded therein, for a first lot of labeling material received and to be tested;
(b) writing labeling material identification and test requirements data into the first portable memory relating to the first labeling material lot;
(c) providing a second portable memory with a unique serial number recorded in memory, for a sample from the first labeling material lot;
(d) writing said labeling material identification, test requirements, and the serial number from the first portable memory into the second portable memory;
(e) testing the sample and writing test data into the second portable memory;
(f) writing the test data and the serial number from the second portable memory into the first portable memory by first reading the identification data from the both the first and second portable memories, comparing the identification data read from the first and second portable memories and writing the test data and the serial number of the second portable memory into the first portable memory if the comparison is favorable; and
(g) repeating steps (a) through (f), using additional first and second memories, for additional lots of labeling material.

14. The method of claim 13, further comprising reading data and serial numbers from the portable memories and writing the data and serial numbers into a main computer database.

15. A method for recordkeeping comprising the steps of:
(a) providing a first portable memory with a unique serial number recorded therein, for a first product to be produced from a plurality of lots of raw material;
(b) writing product identification, process and test requirements data into the first portable memory relating to the first product to be produced;
(c) providing an second portable memory with a unique serial number recorded in the memory, for the first product to be produced from the plurality of lots of raw material;
(d) writing product identification and product raw material component requirements data into the second portable memory relating to the first product to be produced;
(e) writing the serial number from the first portable memory into the second portable memory by first reading the identification data from both the first and second portable memories, comparing the identification data read from the first and second portable memories and writing the serial number if the comparison is favorable;
(f) writing the serial number from the second portable memory into the first portable memory if the identification data comparison is favorable;
(g) obtaining a portion of the first lot of material for the first product to be produced and writing material lot data and serial number from a third portable memory into the second portable memory by first reading the material identification data from the third portable memory and the material component requirements data from the second portable memory, comparing the material identification and requirements data read from the third and second portable memories and writing the material lot data and serial number into the second portable memory if the comparison is favorable;
(h) writing the product batch data and serial number from the second portable memory into the third portable memory if the comparison is favorable;
(i) writing material lot data from the second portable memory into the first portable memory by first reading the product identification data from both the first and second portable memories, comparing the product identification data read from the first and second portable memories and writing the material lot data into the first portable memory if the comparison is favorable; and
(j) repeating steps (a) through (i) for each raw material component of the first product to be produced.

16. The method according to claim 15, further comprising the steps of:
(k) providing a fourth portable memory with a unique serial number recorded therein, for a sample from the first product batch;
(l) writing product identification, test requirements, and the serial number from the first portable memory into the fourth portable memory;
(m) testing the sample and writing test data into the fourth portable memory; and
(n) writing the test data and the serial number from the fourth portable memory into the first portable memory by first reading the identification data from both the first and fourth portable memories, comparing the product identification data read from the first and fourth portable memories and writing the test data and the serial number of the fourth portable memory into the first portable memory if the comparison is favorable.

17. The method of claim 16, further comprising reading data and serial numbers from the portable memories and writing the data and serial numbers into a main computer database.

18. The method for recordkeeping comprising the steps of:
(a) providing a first portable memory with a unique serial number recorded therein, for a portion of the first product to be packaged and labeled;
(b) writing packaged product identification, and packaging and labeling process and test requirements data into the first portable memory relating to the packaged portion of the first product;
(c) providing a second portable memory with a unique serial number recorded in the memory, for a portion of the first product to be packaged and labeled;
(d) writing packaged product identification, and the packaging and labeling material component requirements data into the second portable memory relating to the packaged portion of the first product;
(e) writing the serial number from the first portable memory into the second portable memory by first reading the packaged product identification data from both the first and second portable memories, comparing the packaged product identification data read from the first and second portable memories and writing the serial number if the comparison is favorable;
(f) writing the serial number from the second portable memory into the first portable memory if the packaged product identification data comparison is favorable;
(g) obtaining a portion of the first product to be packaged and labeled, and writing product batch data and serial number from a third portable memory into the second portable memory by first reading the product identification data from the third portable memory and the packaging product requirements data from the second portable memory, comparing the product identification and requirements data read from the third and second portable memories and writing the product batch data and serial number into the second portable memory if the comparison is favorable;

(h) writing the packaged product lot data and serial number from the second portable memory into the third portable memory if the comparison is favorable;

(i) writing the product batch data from the second portable memory into the first portable memory by first reading the packaged product identification data from both the first and second portable memories, comparing the packaged product identification data read from the first and second portable memories and writing the packaged material lot data into the first portable memory if the comparison is favorable.

19. The method according to claim 18, further comprising the steps of:

(j) obtaining a portion of the first packaging material for the first product to be packaged and labeled, and writing packaging material lot data and serial number from a fourth portable memory into the second portable memory by first reading the packaging material identification data from the fourth portable memory and the packaging material requirements data from the second portable memory, comparing the packaging material identification and requirements data read from the second and fourth portable memories and writing the packaging material lot data and serial number into the second portable memory if the comparison is favorable;

(k) writing the packaged product lot data and serial number from the second portable memory into the fourth portable memory if the comparison is favorable;

(l) writing the packaging material lot data from the second portable memory into the first portable memory by first reading the packaged product identification data from both the first and second portable memories, comparing the packaged product identification data read from the first and second portable memories and writing the packaging material lot data into the first portable memory if the comparison is favorable; and (m) repeating steps (j) through (l) for each packaging material component of the first product to be packaged.

20. The method according to claim 19, further comprising the steps of:

(n) obtaining a portion of the first lot of labeling material for the first product to be packaged and labeled, and writing labeling material lot data and serial number from a fifth portable memory into the second portable memory by first reading the labeling material identification data from the fifth portable memory and the labeling material requirements from the second portable memory, comparing the labeling material identification and requirements data read from the fifth and second portable memories and writing the labeling material lot data and serial number into the second portable memory if the comparison is favorable;

(o) writing the packaged product lot data and serial number from the second portable memory into the fifth portable memory if the comparison is favorable;

(p) writing the labeling material lot data from the second portable memory into the first portable memory by first reading the packaged product identification data from both the first and second portable memories, comparing the packaged product identification data read from the first and second portable memories and writing the labeling material lot data into the first portable memory if the comparison is favorable; and (q) repeating steps (n) through (p) for each labeling material component of the first product to be packaged and labeled.

21. The method according to claim 20, further comprising the steps of:

(r) providing a sixth portable memory with a unique serial number recorded therein, for a sample from the first product packaged and labeled;

(s) writing the packaged product identification, test requirements, and the serial number from the first portable memory into the sixth portable memory;

(t) testing the sample and writing test data into the sixth portable memory; and;

(u) writing the test data and the serial number from the sixth portable memory into the first portable memory by first reading the packaged product identification data from the both the first and sixth portable memories, comparing the packaged product identification data read from the first and sixth portable memories and writing the test data and the serial number of the sixth portable memory into the first portable memory if the comparison is favorable.

22. The method of claim 21, further comprising reading data and serial numbers from the portable memories and writing the data and serial numbers into a main computer database.

* * * * *